United States Patent [19]
Heilig

[11] Patent Number: 5,832,787
[45] Date of Patent: Nov. 10, 1998

[54] ATTACHMENT DEVICE FOR CONNECTING A VEHICLE STEERING WHEEL TO A STEERING SHAFT

[75] Inventor: Alexander Heilig, Wissgoldingen, Germany

[73] Assignee: TRW Occupant Restraint Systems GmbH, Alfdorf, Germany

[21] Appl. No.: 725,911

[22] Filed: Oct. 4, 1996

[30] Foreign Application Priority Data

Oct. 20, 1995 [DE] Germany ............ 295 16 623 U

[51] Int. Cl.$^6$ ............................................. B62D 1/04
[52] U.S. Cl. ............................................ 74/552; 403/259
[58] Field of Search ..................... 74/552; 403/259, 403/261, 359, 370, 365

[56] References Cited

U.S. PATENT DOCUMENTS

| | | | |
|---|---|---|---|
| 4,624,596 | 11/1986 | Eckendorff | 403/259 X |
| 4,662,775 | 5/1987 | Faul | 403/365 |
| 4,685,848 | 8/1987 | Langer . | |
| 4,955,744 | 9/1990 | Barth et al. | 403/259 |
| 5,144,861 | 9/1992 | Nishijima et al. . | |
| 5,190,393 | 3/1993 | Svensson | 403/370 |

FOREIGN PATENT DOCUMENTS

| | | | |
|---|---|---|---|
| 2614951 | 11/1988 | France . | |
| 495569 | 3/1992 | Japan | 74/552 |
| 2102092 | 1/1983 | United Kingdom . | |
| 2206181 | 12/1988 | United Kingdom | 403/259 |

*Primary Examiner*—Vinh T. Luong
*Attorney, Agent, or Firm*—Tarolli, Sundheim, Covell, Tummino & Szabo

[57] ABSTRACT

An attachment device for a vehicle steering wheel to a steering shaft is provided, the steering wheel comprising a hub for connection to an end of the steering shaft, the hub and the steering shaft being connected with each other in a non-rotatable manner. The attachment device further comprises a bolt or a threaded nut accomodated rotatably at the hub but being held in an axial direction. The bolt and the nut, respectively, engage the end of the steering shaft in order to interlock the hub and the steering shaft. The attachment device furthermore comprises an engaging element cooperating with the bolt and the nut, respectively, and being provided with an engaging configuration for a clamping tool, the engaging configuration being accessible from outside of the hub.

5 Claims, 2 Drawing Sheets

ATTACHMENT DEVICE FOR CONNECTING A VEHICLE STEERING WHEEL TO A STEERING SHAFT

The invention relates to an attachment device for connecting a vehicle steering wheel to a steering shaft.

BACKGROUND OF THE INVENTION

Normally the following demands are made on such an attachment: the attachment must connect the steering wheel to the steering shaft in a positive and secure way, since accidental loosening of this connection could have grave consequences. Furthermore, the connection must be detachable, so that, for example, the steering wheel can be replaced. Finally, it must also be possible to adjust the angular alignment of the steering wheel in relation to the steering shaft.

With the usual method of attaching the steering wheel to the steering shaft, a spline shaft connection is used to produce the joint-rotation shaft/hub connection. By fitting the hub with internal splines onto the end of the steering shaft formed provided with external splines, a joint-rotation connection is achieved between steering wheel and steering shaft, the angular alignment of which can be adjusted. In order to secure the hub on the steering shaft in the axial direction of the latter, a nut is screwed onto a thread extension formed on the named end of the steering shaft from the inside of the hub, where this nut clamps the hub to the steering shaft. This attaches the steering wheel to the shaft in a positive and secure manner.

As a consequence of the growing safety awareness in recent time, gas bag restraint systems are being increasingly used, which are located on the driver's side inside the hub of the steering wheel. In the interests of efficient assembly, such a gas bag restraint system should already be fitted in the steering wheel when supplied to the vehicle manufacturer. However, the consequence of this is that, as a result of the components of the gas bag restraint system mounted inside the hub of the steering wheel, access to a clamping element located inside the hub is difficult or even impossible.

BRIEF DESCRIPTION OF THE INVENTION

The invention provides an attachment device which allows connecting a steering wheel with a steering shaft from outside the steering wheel hub. According to a first aspect of the invention, the steering shaft comprises a steering wheel provided with a hub for connection to an end of the steering shaft, the hub and the steering shaft being connected with each other in a non-rotatable manner. The attachment device furthermore comprises a bolt provided with a threaded shaft and a head portion with teeth at its circumference, the threaded shaft of the bolt being screwed into a tapped hole in the steering shaft and the head portion being accomodated rotatably but fixed in an axial direction at the hub. Accordingly, the hub and the steering shaft are interlocked. The attachment device further comprises an engaging element cooperating with the teeth of the bolt head portion and being provided with an engaging configuration for a clamping tool, this engaging configuration being accessible from outside of the hub. According to a second aspect of the invention, the steering wheel comprises a hub for connection to an end of the steering shaft, the hub and the steering shaft being connected with each other in a non-rotatable manner. The attachment furthermore comprises a threaded nut provided with internal threads and teeth at its circumference, the threaded nut being accomodated rotatably but fixed in an axial direction at the hub and the internal threads being screwed onto the end of the steering shaft. Accordingly, the hub and the steering wheel are interlocked. The attachment device further comprises an engaging element cooperating with the teeth of the threaded nut and being provided with an engaging configuration for a clamping tool, the engaging configuration being accessible from outside of the hub. In this way, by inserting a suitable tool in the clamping recess, the clamping element can be easily tightened from the rear side of the steering wheel, without having to access the inside of the hub.

BRIEF DESCRIPTION OF THE DRAWING

The invention is explained below with reference to the enclosed drawing. Here.

DETAILED DESCRIPTION OF THE INVENTION

Figure 1:
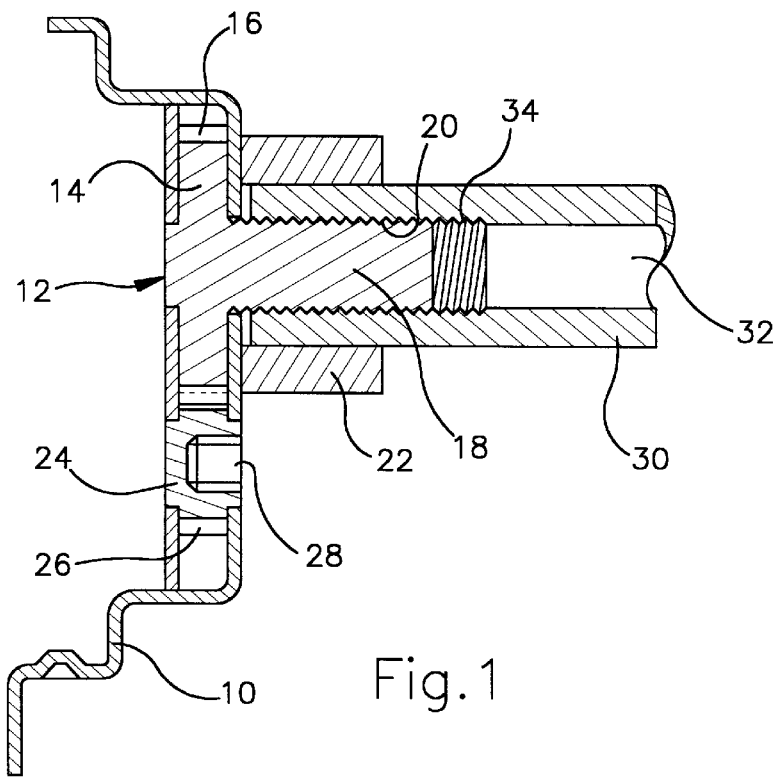
FIG. 1 shows in schematic form a first embodiment of an attachment element for connecting a steering wheel to a steering shaft, according to the invention.

FIG. 1 is a schematic representation of a first embodiment of the invention. The vehicle steering wheel includes a hub 10, shown in section, where the inside of the hub, with respect to the figure, is situated to the left of the illustrated section of the hub 10. In the double wall base of the hub 10 a bolt or threaded member 12 is mounted which is rotatable but retained axially, the head portion 14 of which has teeth 16 around the external circumference. The shaft 18 of the bolt 12 extends through an opening in the base of the hub 10 to the outside and has an external thread 20. The outside of the hub 10 is provided with an attachment in the form of a sleeve 22 which is arranged concentrically with the opening in the base of the hub 10 and encloses the shaft 18 leaving all-round play.

In addition, in the base of the hub 10 a pinion or engaging element 24 is rotatably mounted, the teeth 26 of which engage in the teeth 16. Both sets of teeth are spur-gear teeth. The pinion 24 is provided with an engaging configuration 28 which is accessible from outside the hub 10 and adapted to be engaged by a clamping tool, which, for example, may take the form of a hexagon socket.

The end of a steering shaft 30 associated with the steering wheel has a hole 32, in which is formed an internal thread 34 which is complementary to the external thread 20 of the bolt 12. Furthermore, the external diameter of this end of the steering shaft 30 is adapted to the internal diameter of the sleeve 22.

The steering wheel is connected to the steering shaft in the following way: the steering wheel is placed on the steering shaft until the shaft 18 of the bolt 12 rests against the end of the steering shaft 30. A clamping tool is then inserted in the engaging configuration 28 and, using this clamping tool, the bolt is turned by way of the pinion in the appropriate direction so that the external thread 20 of the bolt 12 is threaded into the internal thread 34 of the steering shaft 30. The end of the steering shaft associated with the steering wheel is drawn into the sleeve 22 until it rests on the base of the hub 10. Once the bolt 12 has been tightened to the appropriate torque, attachment of the steering wheel to the steering shaft is complete.

Figure 2:
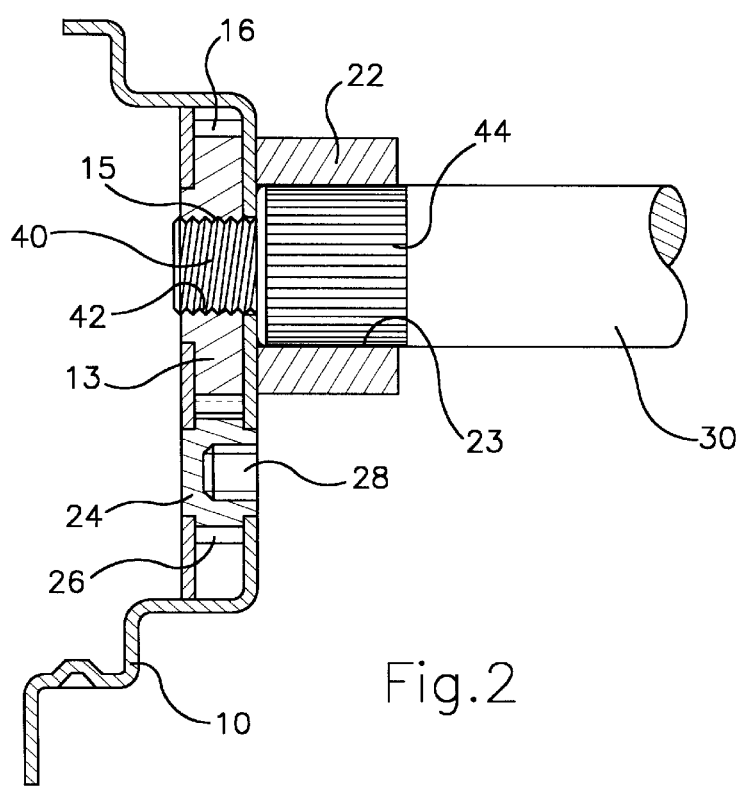
FIG. 2 shows in schematic form a second embodiment of an attachment element for connecting a steering wheel to a steering shaft.

FIG. 2 illustrates in schematic form a second embodiment of the invention. Where this embodiment coincides with the first embodiment, the same reference numerals are used.

The vehicle steering wheel contains a hub depicted in sections, where the inside of the hub, with respect to the figure, is situated to the left of the illustrated section of the hub 10. In the double-wall base of the hub 10 a threaded member or nut 13 is mounted which is rotatable but retained axially. The nut 13 has an internal thread 15 and the external circumference of which has teeth 16. The base of the hub 10 is furthermore provided with an opening in the base and with an attachment in the form of a sleeve 22, where both the opening and the sleeve 22 are centred on the axis of rotation of the threaded nut 13. The inside of the sleeve has internal splines 23.

Furthermore, in the base of the hub 10 a pinion or engaging element 24 is rotatably mounted which corresponds to the pinion from the first embodiment.

The end of a steering shaft 30 associated with the steering wheel is provided with an extension 40 which has an external thread 42 which is complementary to the internal thread 15 of the threaded nut. Attached to the extension 40 is a section which has external splines 44 complementary to the internal splines 23.

The steering wheel is connected to the steering shaft in the following manner: the steering wheel is placed on the steering shaft and the external splines 44 of the steering shaft 30 engages the internal splines 23 of the sleeve 22. A clamping tool is then inserted in the engaging configuration 28 and, using this clamping tool, the bolt is turned by way of the pinion in the appropriate direction, so that the internal thread 15 is threaded onto the external thread 42.

The end of the steering shaft associated with the steering wheel is drawn further into the sleeve 22 until it rests on the base of the hub 10. Once the nut 13 has been tightened to the appropriate torque, attachment of the steering wheel to the steering shaft is complete.

Because the pinion is connected to the clamping element and because of the engaging configuration formed in the pinion, it is not necessary to access the inside of the hub in order to attach the vehicle steering wheel to the steering shaft. Therefore, it is possible to mount the appropriate components of a gas bag restraint system inside the hub of the steering wheel before the steering wheel is connected to the steering column. According to a further development (not illustrated) of the first and second embodiment, the bolt and the steering shaft may be hollow so that a gas generator can be accommodated in the steering shaft, which is then connected by way of the inside of the steering shaft to the inside of the hub in which the appropriate components of a gas bag restraint system are located. According to an additional further development (not illustrated), the pinion can also be arranged with an axis of rotation which intersects the axis of rotation of the clamping element at an angle of 90°. In this case, both sets of teeth would be bevel gear teeth and the engaging configuration would be accessible from the side.

Figure 3:
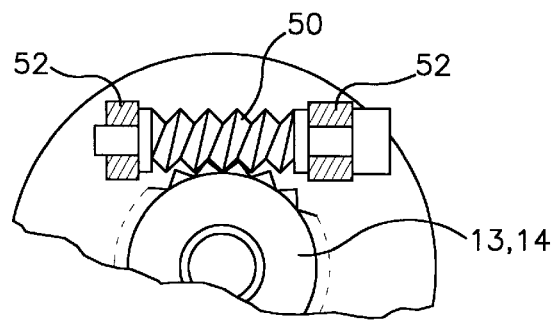
FIG. 3 shows an alternative embodiment.

In the case of the alternative embodiment shown in FIG. 3, the threaded nut 13 or, by analogy, the head 14 of the bolt 12, is driven by a pinion screw or engaging element 50 which is accessible from the side of the steering shaft. This pinion screw 50 is pivoted in bearing elements 52 at the steering wheel hub and is axially secured. As with the embodiments described above, the pinion screw 50, together with the threaded nut 13 or the head 14 of the bolt 12, forms a gear which is self-locking as a result of friction between the elements involved.

Figure 4:
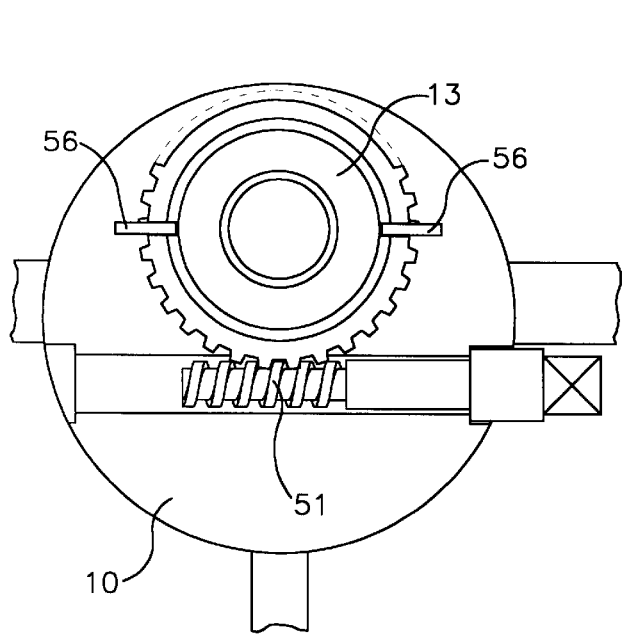
FIGS. 4 and 5 a further alternative embodiment.
Figure 5:
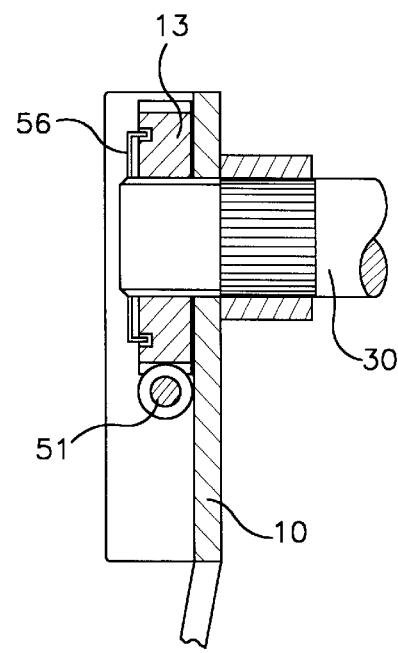

In the case of the embodiment shown in FIGS. 4 and 5, a bolt or engaging element 51 with worm thread is used in order to turn the threaded nut 13 onto the thread at the end of the steering shaft 30. The bolt 51 can be inserted into the hub from either side of the latter, so that the bolt is drawn into the hub and in contact with a suitable abutment both on tightening and on loosening the threaded nut 13. As an alternative, it can be provided that the threaded nut 13 is accessible from one side of the hub, only. In this case it is preferably provided that the bolt 51 utilized for tightening threaded nut 13 has a pitch which is inverted with respect to the pitch of the bolt 51 utilized for loosening threaded nut 13. This prevents bolt 51 from being pushed out of the hub on tightening or loosening nut 13. The bolt 51 can be removed again once the threaded nut 13 has been tightened.

I claim:

1. An apparatus comprising:

a steering shaft having a thread;

a vehicle steering wheel including a hub for connection to an end of said steering shaft, said hub having an inside facing away from said steering shaft, said steering shaft being located outside of said hub;

an attachment device for connecting said vehicle steering wheel to said steering shaft, said attachment device including a threaded member rotatably mounted in said hub and fixed axially in said hub, said threaded member having a portion with teeth at its circumference, said threaded member threadably engaging said thread of said steering shaft so that said hub and said steering shaft are interlocked, an engaging element cooperating with said teeth of said portion of said threaded member and being provided with an engaging configuration for receiving a clamping tool, said engaging configuration being accessible from outside of said hub.

2. An apparatus according to claim 1, wherein said teeth are spur-gear teeth.

3. An apparatus according to claim 1, wherein said teeth are bevel-gear teeth.

4. An apparatus according to claim 1, wherein said teeth form a worm toothing.

5. An apparatus according to claim 1, wherein said hub comprises an extension provided with internal splines (23) and said steering shaft end comprises external splines in order to connect said hub to said steering shaft in a non-rotatable manner.

* * * * *